Jan. 13, 1925. 1,523,060
G. F. ECKART
YIELDING MOUNTING FOR MOTOR VEHICLES
Original Filed June 5, 1920   2 Sheets-Sheet 2
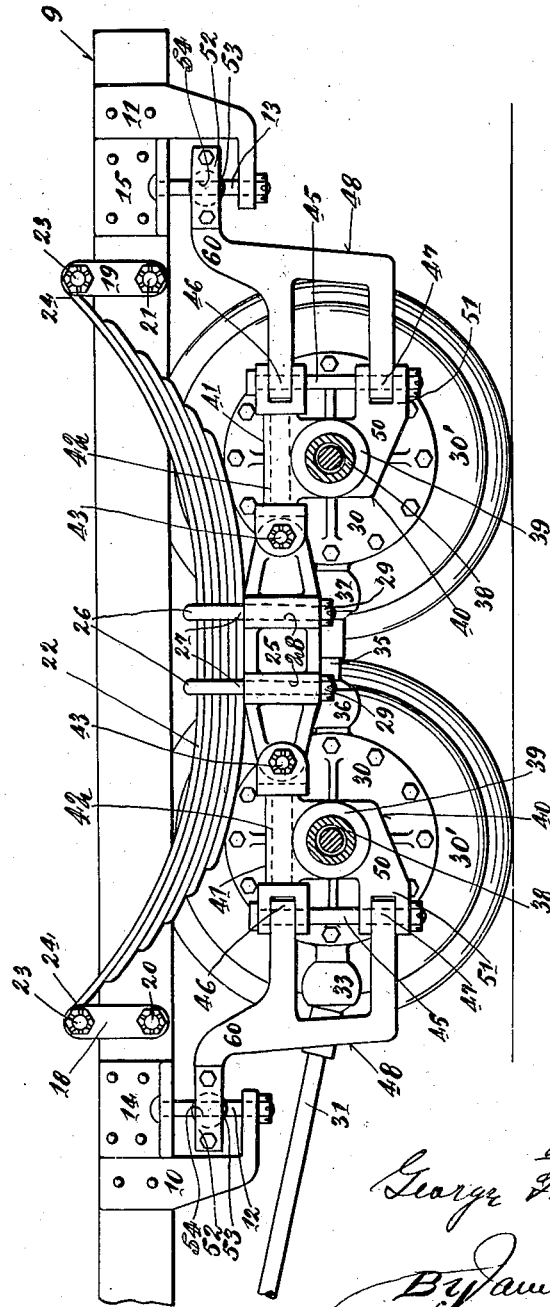

Patented Jan. 13, 1925.

1,523,060

UNITED STATES PATENT OFFICE.

GEORGE F. ECKART, OF CINCINNATI, OHIO.

YIELDING MOUNTING FOR MOTOR VEHICLES.

Original application filed June 5, 1920, Serial No. 386,688. Divided and this application filed February 7, 1921. Serial No. 443,168.

*To all whom it may concern:*

Be it known that I, GEORGE F. ECKART, a citizen of the United States, residing at Cincinnati, in the county of Hamilton and State of Ohio, have invented certain new and useful Improvements in Yielding Mountings for Motor Vehicles, of which the following is a specification.

My invention relates to a mounting for six-wheeled vehicles where the tractive power is had through the four rear wheels, and the method of transmission of power thereto is such as to permit a limited relative movement of the rear axles in any direction. My invention relates more particularly to a mounting for the four rear wheels.

It is the object of my invention to provide a mounting for the rear wheels of automobile trucks designed for heavy duty, whereby the capacity thereof may be very materially increased over any heretofore, so that heavier loads may be carried by equally distributing the same over four wheels.

A further object is to produce a construction which permits more efficient and economical use of four drive wheels by reducing the wear on the tires, and at the same time is so located as to utilize the greatest tractive effort afforded by the weight of the load carried on the truck.

An additional object is to provide a mounting for four-wheeled running gear having a single drive shaft and yet permit the parts to adjust themselves to the varying inequalities of the surface over which the truck moves.

A further object obtained by my improved construction is the manner in which the two rear axles are independently and yieldingly connected with the vehicle springs to produce a more independent reaction, when any of the wheels come into contact with protuberances in the roadway, and at the same time prevent the disturbance of the tractive effort of the other wheels. Also, when a rebound of the spring takes place, the force thereof is not communicated to the axles and running gear, but is received and absorbed by the mounting.

A further object is to provide a construction avoiding the use of radius rods and yet yieldingly hold the rear axles in place in such a manner as to provide a positive connection for communicating the tractive effort to the vehicle, thus avoiding excessive straining of the springs in the longitudinal direction as has been the case heretofore and further to permit of a free floating action of the spring.

These and other objects and advantages are attained in the construction herein described and claimed.

In the drawings:

Fig. 2 is a side elevation of that portion of the truck shown in Fig. 1.

Figure 1:
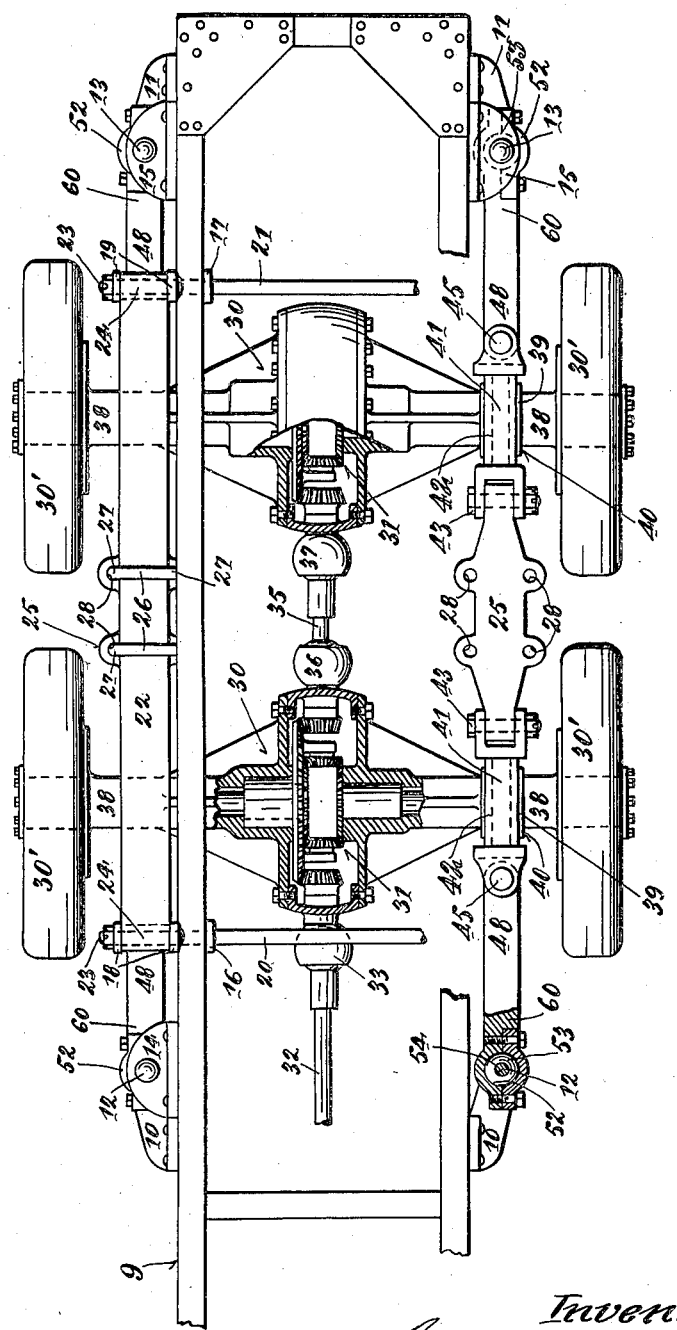
Fig. 1 is a fragmental plan view of the rear portion of a motor truck chassis embodying my invention.

In my improved mounting, a chassis 9 may be of the usual construction designed to support the increased load which my improved mounting is capable of carrying. The chassis is provided on each side with brackets 10 and 11, which extend downwardly and support the lower ends of pins 12 and 13 respectively. The upper ends of the pins are located in outwardly projecting brackets 14 and 15 secured to the chassis adjacent to the brackets 10 and 11.

Brackets 16 and 17 secured to the frame have shackles 18 and 19 journalled on cross shafts 20 and 21 therein. Springs 22 have connection with the shackles by means of pins 23, having free movement in eyes 24 thereof. The springs are secured to blocks 25 by means of clips 26 the tangs 27 of which pass through holes 28 and are held in place by nuts 29.

Axle housings 30 have therein differential gearing 31. The front axle is driven by a propeller shaft 32 through universal joint 33. A short shaft 35 forms driving connection between the rear axle housings 30 through the medium of universal joints 36 and 37. The axle housings have wheels 30' journalled thereon.

The axle housings have bearing ends 38 supporting bearings 39 of bearing members 40. The bearing members 40 have sleeves 41, integrally formed therewith, embracing links 42 having horizontal pivot connections at one of the ends with the blocks 25 by pins 43. The other ends of the links are fixed against longitudinal movement in sleeves 41.

The bearing members 40 further have on their lower ends projecting arms 50, having knuckles 51 thereon. The tangs or ears of the knuckles are received to either side of lugs 46 and 47, the pins 45 passing through holes therein. The links 48 have upwardly projecting arms 60 having spherical sockets 52 formed on the outer ends thereof, adapted to co-act with balls 53 having bearings 54 about the pins 12 and 13.

In operating the truck over an uneven roadway, the combinations of the links and their connections are such as to permit each of the wheels to rest in different horizontal planes without subjecting the axle housings, chassis or springs to any unusual strains. Assuming that a heavy load is carried by the truck and the left forward wheel is resting on a high place in the roadway, the rear axles, therefore, are in an oblique position to one another. It will be observed that this would cause the sleeves 41 to move slightly relative to the links 42 and carry with them links 48 without any twisting strain being communicated to the running gear or chassis as it is taken care of by the balls 53 in the sockets 52. The torque of the axle has not been disturbed because of the universal action of links 48 and the yielding connection of bearing members 40 with the connecting mechanism. Similarly, the rear axle may be simultaneously out of alignment in an opposite direction, without communicating any twisting strains to the frame or running gear, even though the axles are in an oblique position to one another. The blocks 25 acting as weight distributing links assure the equal distribution of the load on all four wheels.

When any or all of the wheels strike a projection or high place in the road, the force of the blow is not communicated to the springs in a horizontal direction, but is transmitted by links 42 in sleeves 41 to the blocks and thus to the springs which having a free floating action by means of the shackles prevents recoil thereof in a direction opposite to that, in which the vehicle is travelling. Consequently only vertical vibrations of the springs are set up, which are not, however, communicated to the driving axles but are considerably damped through the medium of the blocks acting as links having movement in a downward direction only, for the reason that the connections to the bearing members are spaced apart from the axles of the wheels. The vibrations are thus translated into a rocking movement of the bearing members and not communicated directly to the axle housings as in constructions heretofore used, where the axis of the wheel is located directly below the spring.

Having thus fully described my invention, what I claim to be new and useful and desire to secure by Letters Patent is:

1. A mounting for motor vehicles comprising a chassis, a pair of axle housings, differential gearing in said housings, a universal driving connection with one of said housings, a universal driving connection between said housings, bearings for said housings, blocks, links mounted in said bearings and pivotally connected to said blocks, vehicle springs secured to said blocks, means pivotally connecting said springs to said chassis, and links pivotally connecting said housings and chassis.

2. In a mounting for motor vehicles, the combination of a pair of axle housings, bearings for said axle housings, blocks between said axle housings, links pivotally connecting said bearings and blocks, respectively, adapted to permit relative vertical movement therebetween, a chassis, links attached to said bearings and said chassis adapted to permit slight relative vertical movement between said axle housings, and between the chassis and the axle housings.

3. In combination, in a mounting for motor vehicles, a pair of axle housings, bearings for said axle housings, blocks, and links connecting said bearings and blocks, respectively, adapted to permit relative movement therebetween, a chassis, links attached to said bearings and said chassis adapted to permit relative sidewise movement of said bearings and said links, and relative vertical and sidewise movement of the chassis and links, and springs connected at their outer ends to the chassis and intermediate of their ends to said blocks.

4. In a mounting for motor vehicles, a chassis, a pair of axle housings, wheels journalled on said axle housings, bearings for said axle housings, sleeves in said bearings transversely thereof, links in said sleeves, respectively, blocks having pivotal connections to said links in alinement with said axle housings and spaced from the axes of said wheels, links having vertical pivotal connection to said first named links, respectively, brackets on said chassis, pins vertically positioned in said brackets, balls, bearings about said pins in said balls, sockets partly enclosing said balls on said last named links, springs secured to said blocks, shackles, pivot connections on said chassis for said shackles, and pivot connections between the ends of said springs and said shackles.

5. A mounting for motor vehicles comprising a chassis, a pair of axle housings, differential gearing in said housings, a universal drive shaft for driving one of said housings, a universal drive shaft forming driving connection between said housings, rigid blocks pivotally connecting the forward and rear housings, links pivotally connected to each housing and pivotally connected to said chassis, and a spring mounted upon each block and pivotally connected to the chassis.

6. In a mounting for motor vehicles, a chassis, a pair of axle housings, differential gearing in said housings, a universal drive shaft for driving one of said housings, a universal drive shaft forming driving connection between said housings, blocks between and pivotally connected to said housings whereby said housings are adapted to move vertically relative to each other, a spring on each block and connected at each end to the chassis, a pair of links pivoted to each housing and slidably and pivotally connected to said chassis.

7. In a mounting for motor vehicles, a chassis, a pair of axle housings, differential gearing in said housings, a universal drive shaft for driving one of said housings, a universal drive shaft forming driving connection between said housings, blocks between and pivotally connected to said housings, a spring on each block and pivotally connected at each end to the chassis, vertical pivots connected to said chassis, vertical pivots connected to said housings and a link connected at each end to said vertical pivots, respectively.

8. In a mounting for motor vehicles, a chassis, axle housings, brackets on said chassis, vertical pins mounted in said brackets, links each pivotally connected to said housings at one end and having a spherical socket near its other end, a hollow ball in each socket and vertical pins mounted in said brackets and extending through said hollow balls, respectively.

GEORGE F. ECKART.